3,400,202
INSECT CONTROL WITH HEXAMETHYLDITIN
Herbert Q. Smith, King of Prussia, and Edward Everett
Ivy, Devon, Pa., assignors to Pennsalt Chemicals Corporation, Philadelphia, Pa., a corporation of Pennsylvania
No Drawing. Filed Mar. 31, 1966, Ser. No. 538,991
6 Claims. (Cl. 424—288)

ABSTRACT OF THE DISCLOSURE

Method for controlling insects with hexamethylditin.

---

This invention relates to the control of insects and is particularly concerned with the use of hexamethylditin as an insecticide.

In accordance with the invention, insecticidal compositions are provided comprising an inert carrier and hexamethylditin. The invention also embodies the process of controlling insects by contacting them with an insecticidal amount of the active agent. Hexamethylditin is a known compound having the structure $$(CH_3)_3-Sn-Sn-(CH_3)_3$$

The high activity of hexamethylditin as an insecticide is unexpected in view of the fact that closely related homologues show little, if any, insecticidal activity.

Hexamethylditin may be applied undiluted onto insects, onto infested plants, and soil, or it may be formulated into solutions or dispersions of the active agent in one or more of the common solvents normally used as a carrier. For example, hexamethylditin may be dissolved in organic liquids such as ketones (acetone, methyl ethyl ketone, etc.), amides (dimethylacetamide, dimethylformamide, etc.), aromatic hydrocarbons such as benzene, toluene, and xylene, alcohols and glycols, Cellosolve (Trademark), and various oxygen containing industrial organic solvents and the like. Dispersions may also be prepared by diluting the organic solvent system with water in the presence or absence of a surface active agent, and the formulations of the invention may also be employed in aerosol formulations where difluorodichloromethane or similar aerosol propellants are used to form the propellant and dispersion. Likewise, hexamethylditin may be formulated to dusts and powders where the inert carrier will be a clay, such as fullers earth, china clay, kaolin, attapulgite, bentonite and the related aluminum silicates. Likewise, other finely divided inorganic solids may be used as a carrier, and in general, dusts prepared for this type of formulation will have a particle size below about 200 mesh and contain the active ingredient at a concentration ranging from about 0.5 to 25% by weight of the total formulation. The formulations may be sprayed or dusted in the usual manner onto the particular substrate to be protected against insect attack.

The concentration of hexamethylditin in the formulations will vary widely depending upon the particular type and upon the particular method of application. In general, formulations containing from about 0.1% to about 75% by weight will be used. Rates of application will vary also depending upon the insect and the crop to be protected, but in general rates of application from 0.25 to 5 pounds per acre will be used.

Hexamethylditin may also be applied directly to crops (such as cotton) in undiluted form in accordance with airplane application technique now being used with malathion and other known insecticides.

Hexamethylditin is particularly active against mosquito larvae, cockroaches, Japanese bettle, cabbageworm, bollworm, cabbage looper, tent caterpillar, corn rootworm, tussock moth larvae, potato leafhopper, and onion maggot.

In order to further illustrate the invention, the following examples are given:

EXAMPLE 1

Tests of various hexaalkylditin compounds against mosquito larvae

A 0.1% solution of the active agent in acetone was prepared and this solution subsequently diluted with water to give test solutions of 0.1 p.p.m. and 1 p.p.m. Mosquito larvae (*Aedes aegypti*) were placed in this test solution, and after 48 hours they were observed to determine percent kill. The following table indicates the results obtained:

TABLE I

| Compound | Percent kill of mosquito larvae after 48 hours | |
|---|---|---|
| | 0.1 p.p.m. | 1.0 p.p.m. |
| Hexamethylditin | 100 | 100 |
| Hexaethylditin | 0 | 0 |
| Hexapropylditin | 0 | 70 |
| Hexabutylditin | 0 | 0 |
| Hexaisobutylditin | 0 | 70 |
| Hexaamylditin | 0 | 0 |

As can be seen by the above Table I, only hexamethylditin showed activity at 0.1 p.p.m.; none of its homologues showed any activity. At 1 p.p.m. only two of the isomers of hexamethylditin showed limited activity against mosquito larvae. Thus it is clear the hexamethylditin exhibits activity many orders of magnitude greater than the closely related homologues and such activity is indeed surprising and unexpected.

EXAMPLE 2

An emulsion concentrate of hexamethylditin containing 25% of active agent was prepared as follows: 25 parts by weight of hexamethylditin; 5 parts by weight of an alkyl aryl polyether alcohol surfactant ("Triton" X–155) and 70% by weight of xylene were mixed until a solution was obtained. This solution was then diluted by adding it to acetone so that the final emulsion concentrate contained 0.1% of active ingredient.

When tested at 1 p.p.m. against mosquito larvae, 100% kill was obtained after 48 hours.

EXAMPLE 3

Preparation of wettable powder

Twenty-five parts by weight of hexamethylditin was dissolved in acetone and mixed with 75 parts by weight of clay. The acetone was then evaporated to form a wettable powder composition.

This formulation was diluted with acetone to one part per million and was used to test mosquito larvae. The test indicated that at 1 p.p.m., 100% kill was obtained after 48 hours.

EXAMPLE 4

In tests against Japanese beetle adults (*Popillia japonica*) hexamethylditin was formulated to a concentration of 0.1% in acetone and 0.5 ml. of the acetone solution was spread uniformly over the lower surface of smartweed leaf with a pipette to give a test concentration of 0.05 mg./cm.² The acetone was allowed to evaporate and the treated leaf placed in a petri dish, and ten adult Japanese beetles confined with the leaf. Within 48 to 72 hours, 60 to 100% control of the insects was obtained.

In the same test where the active agent was hexabutylditin, no control was obtained.

EXAMPLE 5

A 0.1% by weight acetone solution of the test compound was placed in a 16 oz. wide mouth jar and the jar rotated while the acetone evaporated. In this way a coating on the sides and bottom of the jar corresponding to 0.02 mg./cu.$^2$ was obtained. Adult roaches (*Blatella germanica*) were confined to the jar and periodic observations made to note percent kill.

When hexamethylditin is the active agent 75% kill is obtained in 24 hours. With hexabutylditin, however, no control is obtained in 24 hours.

EXAMPLE 6

A 1% by weight acetone solution of the test compound was further diluted with acetone and 0.01 ml. of the diluted material was applied to the dorsum of each of ten bollworm (*Heliothis zea*) larvae so that each larva received a measured dose of the test compound. When hexamethylditin was applied in this manner, 100% mortality occurred in 48 hours when the dosage was 100 micrograms per larva. At a dosage of 10 micrograms per larva the mortality was 90% after 48 hours.

EXAMPLE 7

Ten parts by weight of hexamethylditin was dissolved in acetone and mixed with 75 parts by weight of clay. The acetone was then evaporated to form a wettable powder composition.

This formulation was then mixed with soil so that the resulting mixture contained 50 parts per million of the test compound. The treated soil was then placed in pots, and onion sets were placed in the soil. The pots were then infested with eggs of the onion maggot (*Hylemya antigua*). One hundred percent kill was obtained.

EXAMPLE 8

Soil mixed with hexamethylditin as in Example 7 was placed in petri dishes, and adults of the northern corn rootworm (*Diabrotica longicornis*) were introduced into the dishes. At a concentration of hexamethylditin of 50 parts per million, 100% mortality occurred in one hour.

EXAMPLE 9

An emulsion concentrate of hexamethylditin prepared as described in Example 2 was diluted with water so that the resulting formulation contained one half pound of hexamethylditin per 100 gallons of water. This material was then sprayed on potato plants which were infested with potato leafhoppers (*Empoasca fabae*). Observations made two days later revealed only two potato leafhoppers on 56 leaflets examined. Similar counts on untreated potato foliage revealed that 263 leafhoppers were present on 56 leaflets.

EXAMPLE 10

An emulsion concentrate of hexamethylditin was prepared as described in Example 2 and diluted with water in such proportions that the resulting formulation contained one pound of hexamethylditin per 100 gallons of water. This material was sprayed on foliage of wild cherry, which was then infested with larvae of the tent caterpillar (*Malacosoma americanum*). After three days, only twenty percent of the foliage protected by hexamethylditin had been consumed by the larvae, untreated foliage was completely consumed by tent caterpillar larvae.

EXAMPLE 11

In a test similar to that described in Example 10, 100 percent kill of tussock moth (*Malacosoma disstrial*) occurred in four hours, when apple foliage was sprayed with hexamethylditin in an aqueous emulsion of hexamethylditin at the rate of one fourth pound of hexamethylditin in 100 gallons of water.

EXAMPLE 12

An emulsion concentrate containing one pound of hexamethylditin was prepared as described in Example 10, and sprayed on cabbage plants. After 30 days, protection from leaf damage from imported cabbageworm (*Pieris rapae*) and cabbage looper (*Trichoplusia ni*) was 97 percent. Untreated cabbage plants were completely destroyed by their insects.

It will be understood that numerous changes and variations may be made from the above description and examples without departing from the spirit and scope of the invention.

We claim:
1. The method of controlling insects which comprises contacting said insects with an insecticidal amount of hexamethylditin.
2. The method of claim 1 where the insect is the bollworm.
3. The method of claim 1 where the insect is the boll weevil.
4. The method of claim 1 where the insect is the mosquito.
5. The method of claim 1 where the insect is the Japanese beetle.
6. The method of claim 1 where the insect is the potato leafhopper.

References Cited

UNITED STATES PATENTS 2,957,785  10/1960  Leatherland _____ 117—138.5

OTHER REFERENCES

Journal of Economic Entomology, 53:445–448, 53 599J5.

Chemical Abstracts, 1926 20:2977$^5$, QDIASI.

ALBERT T. MEYERS, *Primary Examiner.*

S. MANELLO, *Assistant Examiner.*